July 29, 1958 T. S. SANNER 2,844,871
FORK FOR THE SANITARY PREPARATION OF FOODSTUFFS
Filed Dec. 16, 1955
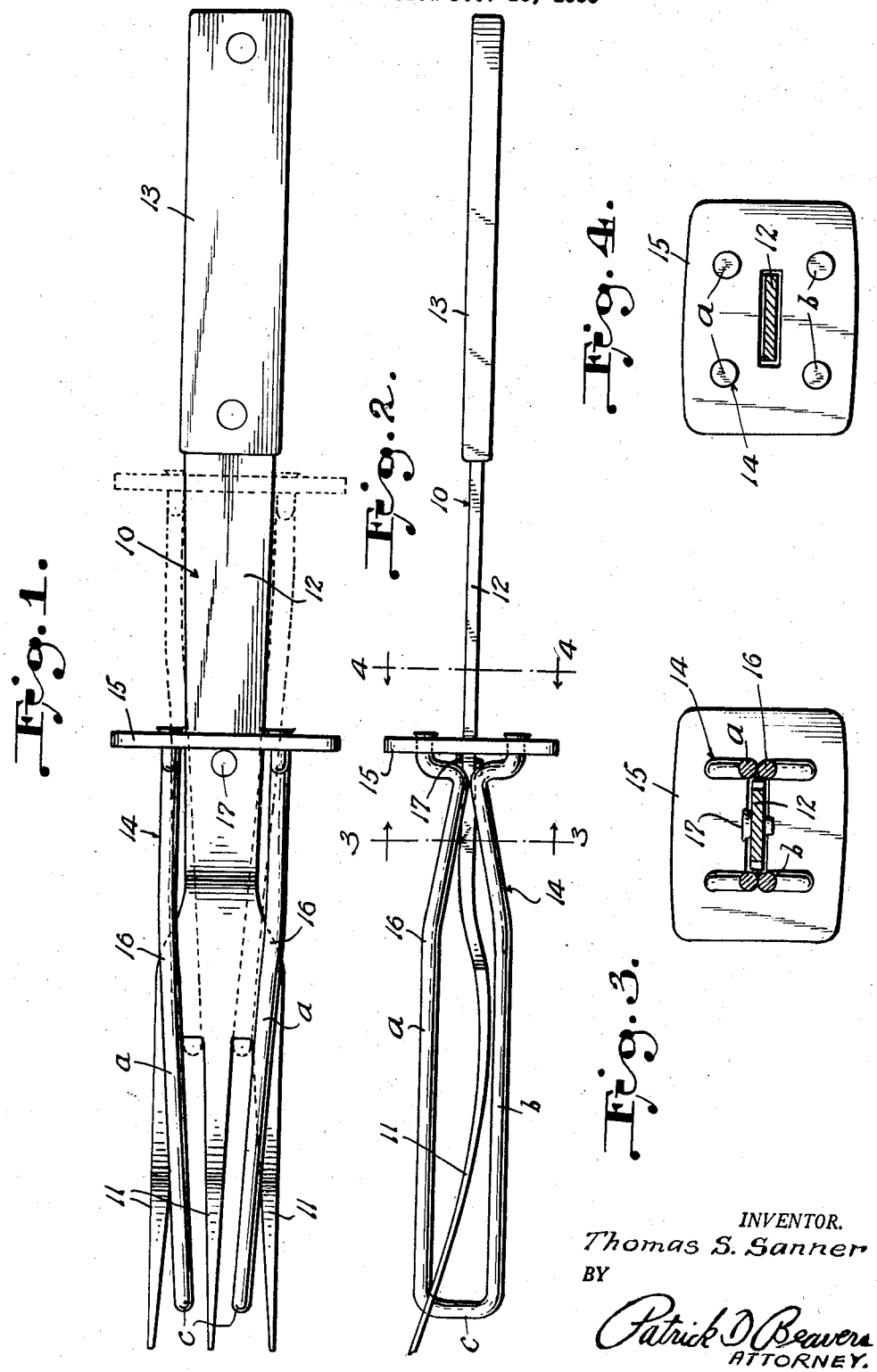
INVENTOR.
Thomas S. Sanner
BY
Patrick D. Beavers
ATTORNEY.

United States Patent Office 2,844,871
Patented July 29, 1958

2,844,871
FORK FOR THE SANITARY PREPARATION OF FOODSTUFFS

Thomas S. Sanner, Hooversville, Pa.

Application December 16, 1955, Serial No. 553,516

1 Claim. (Cl. 30—129)

This invention relates to kitchen utensils and more particularly to a fork for use in the sanitary handling and preparation of foodstuffs.

An important object of the invention is to provide a fork which is provided with a retractable plunger and which plunger may be used for dislodging food from the fork without requiring the human hand touching of the food.

Another object of the invention is to provide a fork of the character stated which is of simple construction and capable of being manufactured and retailed at a low monetary figure.

Other objects and advantages of the invention will become apparent to the reader of the following description.

In the drawing:

Figure 1 is a top plan view of the fork.

Figure 2 is a side elevational view.

Figure 3 is a cross section on line 3—3 of Figure 2.

Figure 4 is a cross section on line 4—4 of Figure 2.

Referring to the drawing wherein like numerals designate like parts, it can be seen that numeral 10 generally refers to a fork of generally conventional construction, the same having a head portion provided with a plurality of curved tines 11 and a shank portion 12 extending from the head portion and provided with a handle 13.

The present improvement over the fork in general is referred to by numeral 14 and consists of a finger operative slide plate 15. This plate 15 has a slot therein for receiving the shank 12. For a three tine fork there are two arms 16, 16 protruding from the pusher plate 15, these arms 16 each being constructed, as shown in Figure 2, with upper and lower side portions $a$, $b$, bridged by a connector $c$ between the tines 11, the ends of the side portions $a$, $b$ are embedded or otherwise secured to the pusher plate 15 as substantially shown in Figure 2. A pin 17 protrudes upwardly and downwardly from its fixed position in the forward portion of the shank 12 to limit forward motion of the pusher plate 15.

In the use and operation of this device, the food dislodging structure 14 is normally in the dotted line retracted position shown in Figure 1. The fork is used in the usual way and when it becomes necessary to pick up articles such as pickles, beets and even meats and various other kinds of food, it is quite easy to dislodge the food without using another implement or the user's other hand, simply by pushing the plate 15 forwardly from its frictionally held position on the inner end portion of the shank 12, which causes the connectors $c$, $c$ to dislodge the food from the tines.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A cooking implement of the character described comprising a fork having a tined head and a shank extending therefrom, a handle for the shank, a slide element on the shank and arms extending from the slide element forwardly and having portions projecting between the tines of the fork head, said element being in the form of a plate having a slot therein for receiving the shank, said shank being tapered to permit the plate to bind against the same when in retracted position.

References Cited in the file of this patent

UNITED STATES PATENTS 750,697    Proskauer _____ Jan. 26, 1904